Dec. 16, 1952 R. V. REPPERT 2,621,772
POWER-OPERATED TYPEWRITING MACHINE
Filed Jan. 9, 1950 6 Sheets-Sheet 1

Fig.1

INVENTOR.
Richard V. Reppert

Dec. 16, 1952     R. V. REPPERT     2,621,772
POWER-OPERATED TYPEWRITING MACHINE Filed Jan. 9, 1950     6 Sheets-Sheet 4

INVENTOR.

Richard V. Reppert

Dec. 16, 1952  R. V. REPPERT  2,621,772
POWER-OPERATED TYPEWRITING MACHINE
Filed Jan. 9, 1950  6 Sheets—Sheet 5

Patented Dec. 16, 1952

2,621,772

UNITED STATES PATENT OFFICE 2,621,772

POWER-OPERATED TYPEWRITING MACHINE

Richard V. Reppert, Rochester, N. Y.

Application January 9, 1950, Serial No. 137,523

6 Claims. (Cl. 197—12)

1

This invention relates to improvements in typewriting machines and more particularly to the type of typewriting machines in which a type plate carrying embossed type representing characters, figures, etc., has movement of translation in a horizontal circular path to position a selected type, in alignment with the typing means. This type plate is movable in either direction from a normal or central position and the type thereon are preferably arranged in three rows so that the type plate, in addition to its horizontal movement of translation is subject to vertical movement of translation to position either row of type, in alignment with the typing means.

It is an object of this invention to move the type plate with power means under control of the typewriter keys and to move its with gradual acceleration from rest position and with gradual deceleration to typing position, to thereby eliminate the manual effort of moving the type plate and to operate the machine at high speed without shock and noise.

Another object is to provide two power means, one for each horizontal directional movement of the type plate, each under control of the certain of the keys and each adapted to function to move the type plate to typing position during the first half of the cycle and to reset it during the second half of a cycle. Furthermore, the two power means being coordinated so that either can function to move the type plate during the second half of the cycle of the other one; thereby providing for a continuous movement of the type plate from one end position to the other end position, which enhances the speed of operation.

Another object is to provide power means for moving the type plate in vertical direction, to position a row of type thereon in alignment with the typing means and to move the type plate to typing position with gradual deceleration to thereby facilitate speed of operation and to eliminate shock and noise.

Another object is to provide power means for simultaneously moving the type plate in its horizontal path and in its vertical path to thereby position a selected type in alignment with a typing means and to facilitate the speed of operation.

Another object is to provide a typing mechanism comprising a hammer or rod adapted to be power operated to force the ribbon and paper against the type plate for typing operation and consisting of a toggle linkage with an adjusting means, whereby the typing force can be increased

2 or diminished without increasing or diminishing the mass in motion or its speed of operation. By these means the typing force can be adjusted for various sizes of type characters on the type plate, in order to obtain uniform and sharp typing.

Another object is to provide a typing mechanism comprising a hammer or rod adapted to be power operated to force the ribbon and paper against the type plate for typing operation and consisting of a toggle linkage with an adjusting means, whereby the typing force can be increased or diminished without increasing or diminishing the mass in motion or its speed of operation, and furthermore, by providing means under control of the keys to automatically increase or decrease the typing force, in accordance with the face of the type.

Yet another object of this invention is to provide a typewriter of the type set forth, with a standard key board and a shift key, in which the keys are operable in the standard manner, to thereby close contacts and induce power operated means to position a type on the type plate, representing the key operated, in alignment with the typing means. This provision makes it possible for an operator trained to operate a standard typewriter to operate this machine with ease and speed.

And another object is to provide a positioning mechanism for the type plate comprising the typewriter keys to select a type for typing operation, a power mechanism adapted to be connected by the keys to move the type plate and stopping devices for the type plate to stop and hold it in precise typing position, these stopping devices being set in position by power means also under the control of the typewriter keys.

General outline

The machine herewith illustrated and described is of the key controlled type plate type where the printing is formed by the impact of a printing hammer or rod, which forces the paper against the ribbon and type and is known in the art as the "Varityper."

The keys close circuits for selecting magnets which control the extent of arcuate movement imparted to the type plate by either of the two power operated actuating levers by selecting the pivotal position or fulcrum on the respective lever about which the lever will be oscillated by the power mechanism. From the selecting magnets the circuit extends to the unlocking magnets for the actuating levers and the unlocking operation of a magnet connects the clutch mechanism for the respective lever with the power means so that the continuously rotating motor will actuate this actuating lever for one reciprocatory movement or one cycle.

The power means impart reciprocatory movement of gradual acceleration and gradual deceleration to the actuating lever and therefore the lever moves the type plate with gradual acceleration and gradual deceleration to its typing position against a stop rod, set in position by the same magnet which selected the pivotal position or fulcrum on the actuating lever. The type plate is moved from a normal position, in either direction by a gear sector, constrainedly connected to both of the actuating levers, by a linkage mechanism. By these means either actuating lever can be constrainedly operated without affecting the other one.

From certain of the keys a circuit also extends to the type place shift mechanism, which is operated by a magnet to shift the type plate to its third row position and this movement can take place simultaneously with the movement imparted to it by the fulcrum lever, thereby facilitating the speed of operation.

A circuit control is provided to hold open the circuit for the unlocking magnet of one power mechanism during the first half of a cycle of the other power mechanism.

The type hammer or rod is operated by a toggle linkage which, in turn, is operated by a solenoid, the plunger of which acts as a mass tending to straighten the toggle, thereby exerting a force, depending upon the angular condition of the linkage in typing position. To adjust this force, the end link is mounted on an eccentric which when rotated to different positions changes the instant center of the linkage in typing position and thereby the typing force. This eccentric is rotated or adjusted manually by a worm drive and is also adjusted, to a limited degree by two magnets which are energized by the operation of certain of the keys.

Reference is now made to the accompanying drawings wherein like reference numerals indicate like parts and wherein.

The keys 1 are mounted on shaft 2 in the machine side plates 11 and 12 and upon operation, close contacts 3 and 4, which are mounted on the transverse bar 5, made of insulating material. See Fig. 1. A transverse current distributing bar 6 is mounted on the bar 7 made of insulating material and a conductor or wire leads from bar 6 to the upper blades of contacts 3. From the lower blade of contacts 3, a conductor wire may lead to one or more of the three transverse bars 8, 9 or 10, mounted on the bar 7. These bars extend the current respectively to the shift mechanism and to the typing force control mechanism, as will be explained hereinafter.

Figure 1:
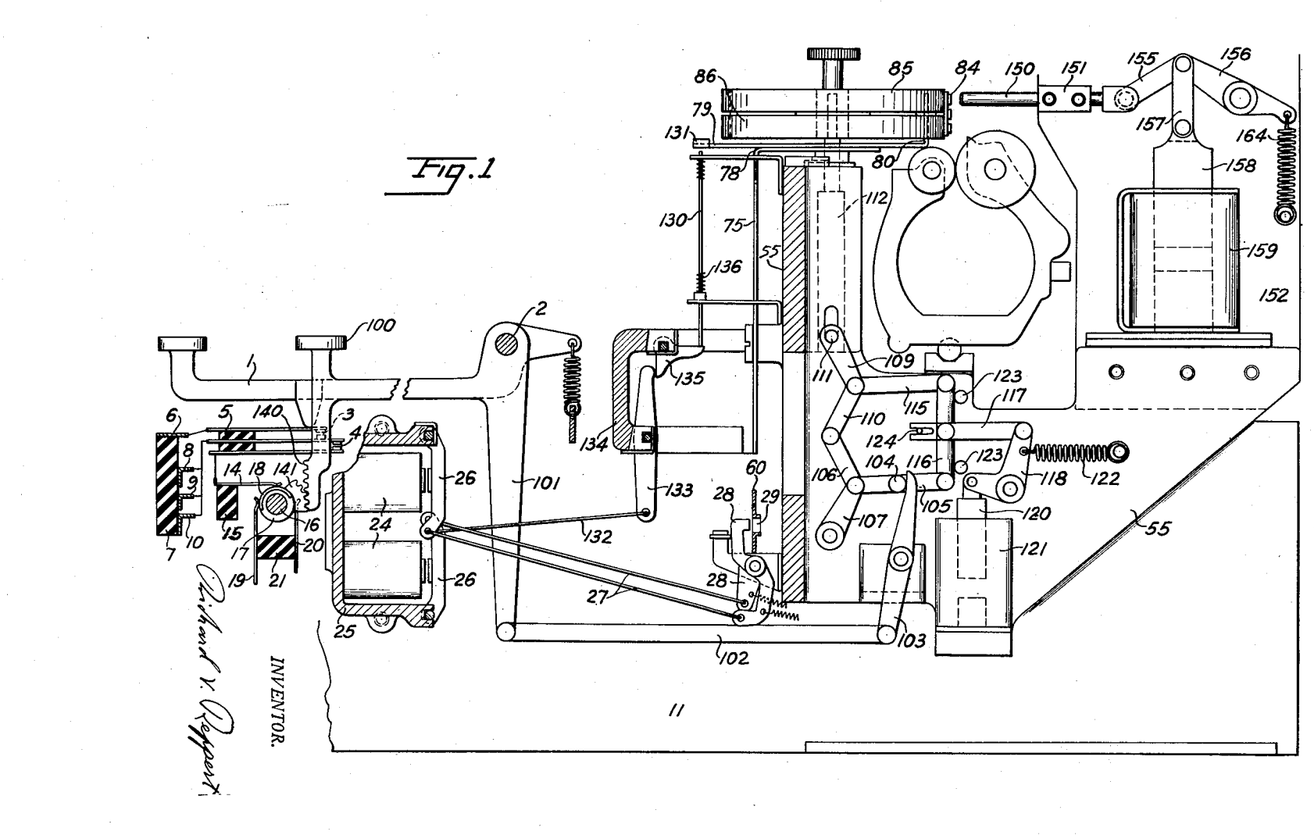
Fig. 1 is a schematic side elevation of the magnetic fulcrum selecting and type plate stop setting mechanism and the shift mechanism.

The lower contacts 4 connect to brushes 14, on the transverse member 15, of insulating material.

A transverse shaft 16 mounted in the machine side plates carries a tube 17, of insulating material and on this tube are mounted individual commutator rings 18, one or more for each key. These rings extend around the tube 17, to a varying extent, according to the requirement of the particular key. Two series of brushes 19 and 20 are mounted on a transverse member 21, of insulating material and bear against the tube 17 or a commutator ring 18.

From the brushes 19 and 20, the current extends to selecting magnets 24, which function to select the position to which the type plate is to be moved and which corresponds to the key operated, and it also may extend to one or more of the bars 8, 9 and 10.

The magnets 24 are mounted in two tiers in a transverse casing 25 mounted between the machine side plates 11 and 12 and from each armature lever 26 a wire link 27 extends to the lower arm of a lever 28, which is termed fulcrum selecting lever, as it functions to select or establish a fulcrum for the lever which is power operated to move the type plate to a varying extent.

Figure 7:
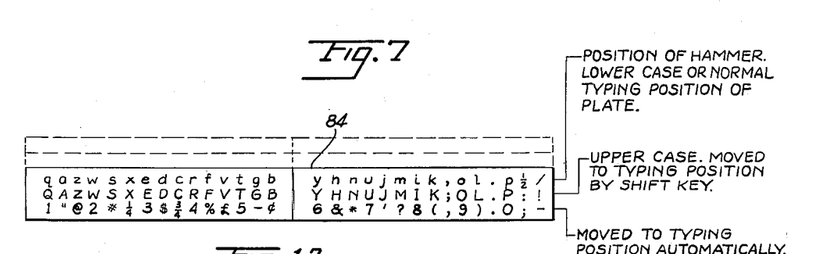
Fig. 7 is a developed view of the type plate and the arrangement of the type therein.

In the machine illustrated there are 45 typewriter keys and the type plate, schematically shown in Fig. 7 has 90 type, arranged in three rows, of 30 type in each row.

The type plate is adapted to be rotated from a normal or center position, in either direction, to fifteen different positions and in each position there are three different vertical or typing positions.

The type plate has therefore horizontal movement of translation in a circular path, in two directions from a normal position and also vertical movement of translation, to position it in either of three typing positions.

The described design of the type plate is well known and is used in the typewriter, commercially known as the Vari-Typer.

To move the type plate to fifteen different positions in each direction, two, essentially similar, power mechanisms are provided, each being under the control of certain of the selecting magnets 24 and these in turn, are under the control of the typewriter keys.

Certain ones of the aforesaid magnets 24, function to cooperate with the power mechanism which moves the type plate in one direction and others, cooperate with the power mechanism which moves the type plate in the opposite direction.

Figure 2:
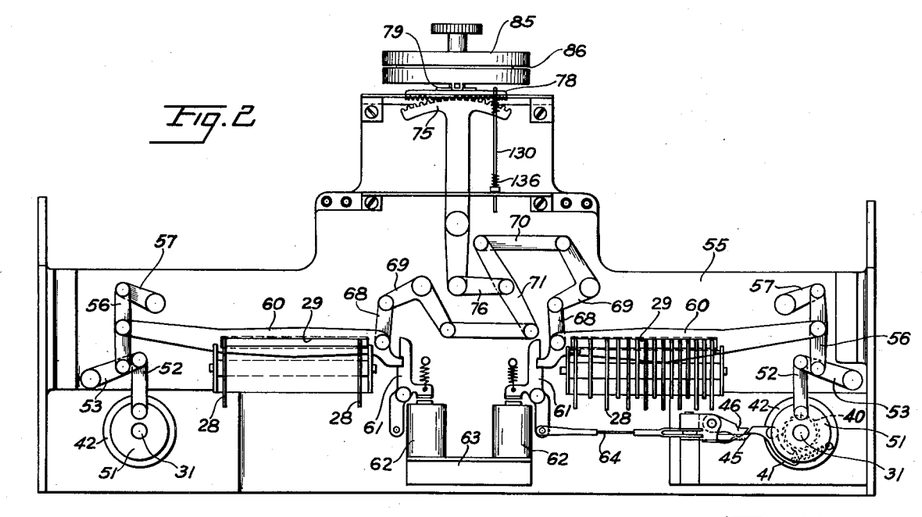
Fig. 2 is a schematic front elevation showing the power driven fulcrum bar with its fulcrum selecting mechanism and its linkage connection to the type plate.
Figure 3:
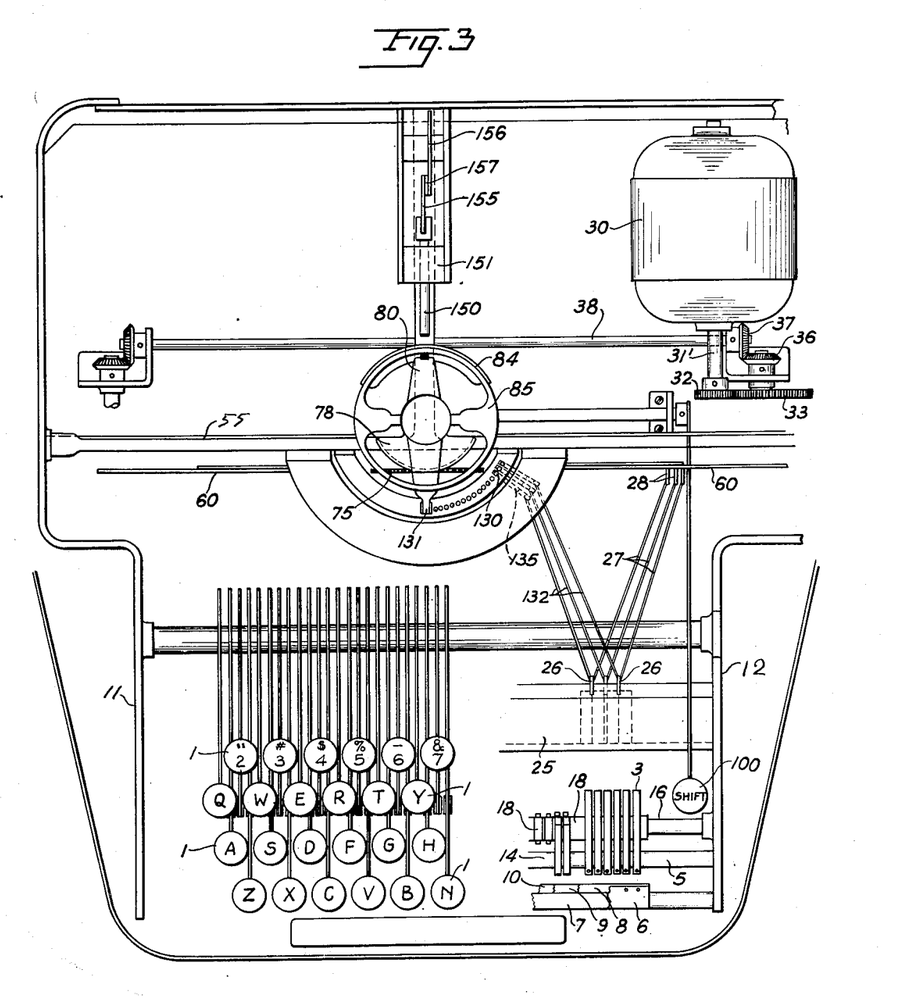
Fig. 3 is a schematic plan view showing the type plate, the keyboard and the motor drive mechanism.
Figure 4:
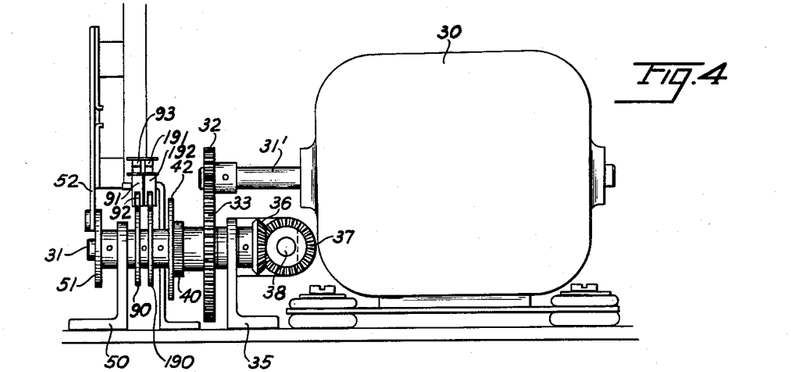
Fig. 4 is a detail side elevation of the motor drive and clutch mechanism.

The power is derived from a motor 30, Figs. 3 and 4, the shaft of which mounts a pinion 32 in engagement with a gear 33, mounted on a sleeve on the shaft 31. The sleeve extends through the bearing 35 and mounts a bevel gear 36 which meshes with a bevel gear 37 on the transverse shaft 38 which drives the other type plate actuating mechanism. Connected to the gear 33 is a clutch ratchet 40 which is subject to engagement by a pawl 41, Figs. 2 and 4, on the pawl disc 42 tight on shaft 31. The pawl is normally held out of engagement with the clutch ratchet by the escapement member 45 of an ordinary escapement mechanism and when this escapement member is oscillated to release the pawl, the pawl will drop into engagement with the ratchet and thereby the shaft 31 and parts mounted thereon, will be rotated one revolution or cycle, as then the pawl will be engaged, either by the loose dog 46 of the escapement or the aforesaid member 45.

The shaft 31 extends through the bearing 50 and a disc 51 mounted on the shaft extension has an eccentrically mounted link 52 connected to a lever 53, see Fig. 2, mounted on the transverse frame member 55.

From the lever 53, a link 56 extends to a lever 57 mounted on the frame member 55 and at the center position of the link 56 a transverse lever 60 is pivotally connected. This lever 60 is termed fulcrum lever, as it is subject to movement or oscillation about different fulcrum positions.

The described mechanism imparts straight line motion to one end of the fulcrum lever. The other end of the fulcrum lever is normally locked by engaging a notch in the armature lever 61 pivotally mounted on the frame member 55 and subject to releasing function by the magnet 62 on bracket 63. A link 64 extends from the armature lever 61 to the escapement member 45, so that upon release of the fulcrum lever, the clutch mechanism is operated to cycle and oscillate the fulcrum lever. A link 68 connects the fulcrum lever to a bell crank 69 and a link 70 connects the bell crank 69 with a lever 71, connected to a gear sector 75 by a link 76. The opposite end of lever 71 is connected to the other fulcrum lever (left hand in Fig. 2) with a similar linkage mechanism and this fulcrum lever is also normally locked by an armature lever.

The gear sector 75 engages a crown gear 78 to which is mounted a plate 79 which has an upward extension 80 for engaging and moving the type plate 84. See Fig. 1.

The type plate is slidably mounted on the anvil 85, with a fin on the plate, sliding in the guide slot 86. The fin extends through the slot and has a perforation which is engaged by the extension 80 of the plate 79. By these means the type plate is moved in a circular path in either direction by the movement imparted to the gear sector 75 from either power mechanism.

Figure 5:
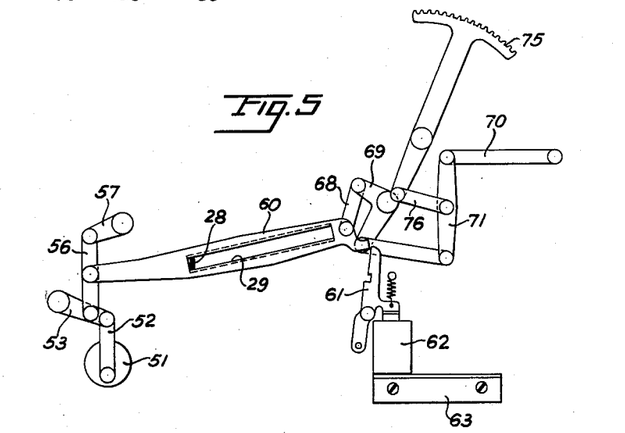
Fig. 5 is a schematic side elevation of the fulcrum bar in its extreme actuating position.

The aforesaid fulcrum selecting levers 28 are operated by the selecting magnets so that the upper end of a lever 28 enters a slot 29 in the fulcrum lever thereby establishing a fulcrum for the lever. Immediately upon establishment of a fulcrum, the lever is oscillated by a clutch cycle. The extent of oscillation of the left end of the lever, Fig. 2, depends upon which one of the fulcrum selecting levers has been operated. There are fifteen selecting levers for each of the two fulcrum levers and the selecting levers are so positioned that they select a point of oscillation or fulcrum on the fulcrum lever, that will impart movement to the type plate to a typing position corresponding to the key operated. For instance, the extreme left hand selecting lever, Fig. 5, will establish a fulcrum which imparts the maximum movement to the type plate and moves it to the last typing position of a row. See Fig. 5.

The above described mechanism for positioning the type plate makes it possible to move the type plate with continuous movement from one end position to the other end position.

At one half cycle position, the type plate is positioned for typing and after typing will commence resetting movement. If, at this instant the other power mechanism is operated to move the type plate to a type in the opposite group, it can function to do so and the type plate will move with continuous movement and accelerated speed, to the new or second typing position. This, of course, enhances the speed of operation.

Figure 9:
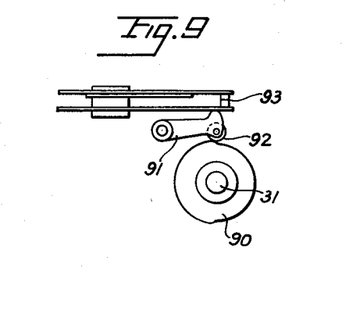
Fig. 9 is a detail view of the interlocking contact cam.

To prevent operation of a fulcrum lever while the other one is functioning to position the type plate, during the first half of its cycle, an interlock is provided, so that the release magnet 62 of a fulcrum lever cannot be energized until the other fulcrum lever has completed a one-half cycle. See Figs. 4 and 9. On the clutch shaft 31 of each power mechanism, a cam disc 90 is mounted and a small cam follower 91 made of insulating material, carries a roller 92 bearing against the periphery of the cam. A contact 93, normally closed, is held in this position by the follower and upon rotation of the clutch shaft will open the contact and the cam will again close the contact after one-half cycle or revolutions.

The circuit which extends to a release magnet for one fulcrum lever, is sent through the contact, controlled by the clutch mechanism for the other fulcrum lever, so that one will not function during the first half cycle of the other one.

As stated, the type plate has three rows of type, see Fig. 7, and is therefore subject to vertical shifting movement in order to type in any one of the three rows. A shift key 100 is pivotally mounted on shaft 2 and the downward extension 101 has a link connection 102 to a lever 103, the upper end of which bears against a roller 104 on a link 105. The link 105, when actuated, straightens the toggle linkage consisting of members 106 and 107, of which the latter is pivoted on the frame member 55. This toggle linkage transmits movement to a second toggle linkage, consisting of members 109 and 110 and the member 109 is pivotally connected to a pin 111 that extends through a slot in the frame work and is fastened to a shaft 112 slidably mounted in the frame work. The anvil 85 on which the type plate 84 is mounted, rests on a shoulder on shaft 112 and the upward movement of the shaft raises the anvil and the type plate to 2nd and 3rd row positions. A link 115 connects the upper toggle linkage to the upper end of a lever 116 in the same manner as the link 104 connects to the lower end of the lever 116. See Fig. 1. A link 117 connects to the lever 116 midway between the links 104 and 115 and connects to the upward arm of a bell crank 118, the other arm of which connects to the plunger 120 of a solenoid 121. A spring 122 tends to hold the lever 116 against the stops 123 on the frame work and a pin 124, in the frame work holds the link 117 and connected parts, in position.

The operation of the shift key straightens the lower toggle linkage and thereby raises the type plate, to type in the middle row of type.

When the solenoid 121 is energised, both toggle linkages will be straightened and thereby the type plate will be raised to type in the lowest or third row of type. The straightening of the toggles imparts gradually decelerated movement to the type plate so that it is positioned without shock and noise and a spring, not shown, connected to the pin 111 on shaft 112, tends to hold the shaft in lower or normal position.

The type plate is automatically moved to the lower or third row position by the operation of certain of the typewriter keys and for such keys, a conductor 114 extends from the contact 3 to the bar 8 and from this bar to the solenoid 121. For some of the typewriter keys, the solenoid 121 is operated by a conductor extending from a brush 19 or 20, to the bar 8. By these means the type plate is shifted to lower row position and this shifting movement takes place while the type plate is being positioned, to select a type in the row.

As described the type plate is moved to a selected typing position by the operation of the respective fulcrum lever. It is however, desirable to position the type plate very precisely in order to obtain a perfect typing impression. To this end, stop rods 130 are provided and the plate 79, which moves the type plate, has upward extension 131, see Fig. 1, to cooperate with the stop rods by bearing against a stop rod that has been selected and raised. There are two groups of stop rods, one for each directional movement of the type plate.

The armature levers 26 of the selecting magnets 24 have a wire link connection 132 to the lower ends of levers 133 mounted in a bracket 134 fastened to the frame member 55. See Figs. 1 and 3. The upper ends of these levers engage the downward extending arms of the small bell cranks 135, also pivotally mounted in the bracket 134. The other arms of the bell cranks underlie the stop rods 130, which are normally held down, in normal position by springs 136 and upon operation of an armature lever, the respective stop rod is raised, to intercept the plate 79, which is moved against it with a gentle pressure to thereby hold the plate in precise typing position, during typing operation.

Figure 6:
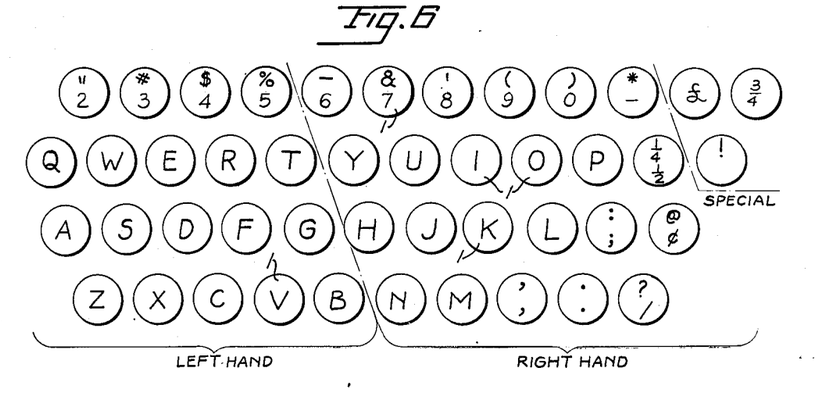
Fig. 6 is a plan view of a standard key board arrangement.

Fig. 6 is a diagrammatic view, showing a standard typewriter keyboard and three special keys. Fig. 7 is a diagrammatic view of a type plate arrangement and Fig. 8 is a circuit diagram.

For the alphabet keys and some other keys the functioning of the machine is standard, that is, for the typing of characters in capital position, the shift key is operated and moves the type plate to the second row position. For the figure keys and some other characters, the type plate is automatically shifted to the third row position, as described, and for the cap characters and the figure keys, the operator will operate the shift key, but the type plate is shifted automatically and the operation of the shift key does not affect the shift operation but lets the operator operate the key board in the standard manner.

Figure 8:
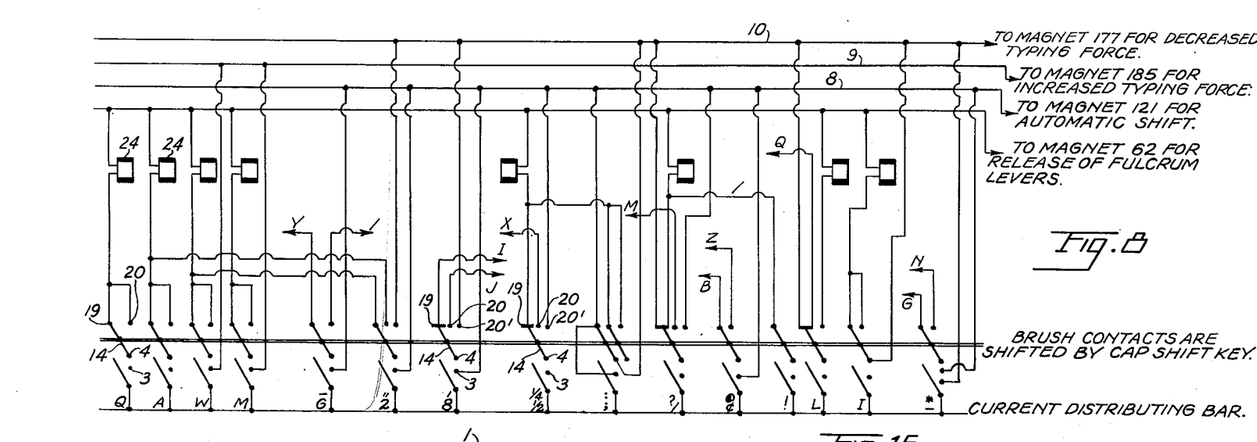
Fig. 8 is a wiring diagram showing the key circuits in their non-operating positions.

It will be observed that the type "digit 8" for instance, is located on the type plate in the third row and in the same lateral position as the letter "I." Therefore the circuit from brush 19, Fig. 8, must extend to the selecting magnet which operates the fulcrum selecting lever which causes the fulcrum lever to position the type plate in "I" typing position; also the same magnet operates the stop rod 130 which stops the plate 79 in "I" typing position.

As the type "8" is in third row position, the type plate will be automatically shifted to third row position, by the means hereinbefore described.

The figure key "8" has in its capital position the character " ' " and this type is positioned on the type plate in the same lateral position as the type "J." Therefore the circuit must extend to the selecting magnet 24 which operates the fulcrum selecting lever which causes the fulcrum lever to position the type plate in "J" typing position.

Figure 14:
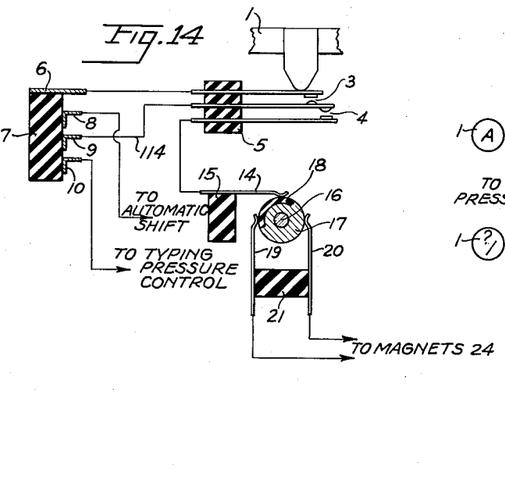
Fig. 14 is an enlarged diagrammatic view of the commutator, its associated contacts and their connections.
Figure 15:
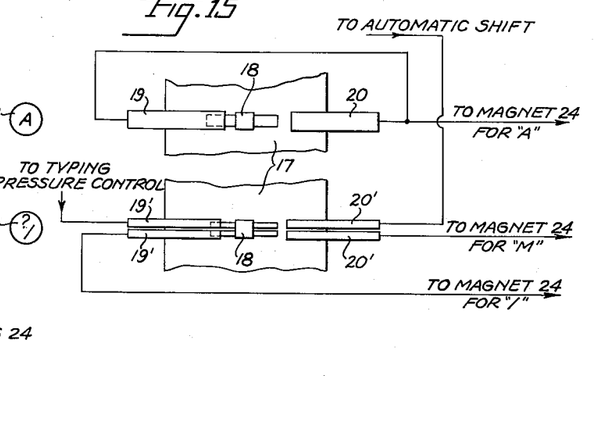
Fig. 15 is an enlarged developed view of the commutator showing the arrangement of the commutator strips and the contacts therefor.

The operator will operate the shift key and a rack extension 140 on the shift key, meshes with a gear sector 141 on the shaft 16 and rotates the same, to move the commutator rings 18 for this key, off of the brushes 19 and 19' and on to the brush 20 and from this brush, the circuit extends to the selecting magnet for the "J" typing position. As the character " ' " has a very small typing surface, a conductor connects contact 4 with the bar 10 which connects with the typing force control mechanism, as will be described hereinafter. (See Figs. 14 and 15.)

*Typing mechanism*

For this type of machine, there are provided a large variety of sizes of type and furthermore, the type of one type plate vary considerable in the size of the type face, so that, in order to obtain uniform typing, the typing force should vary proportionately.

In the present machine, the typing member is in the form of a rod, which is operated by a toggle linkage.

The rod 150 is slidably mounted in a bracket 151 fastened to the frame plates 152 and 153 and is operated by the toggle links 155 and 156. A link 157 connects the toggle linkage to the plunger 158 of the solenoid 159.

Figure 10:
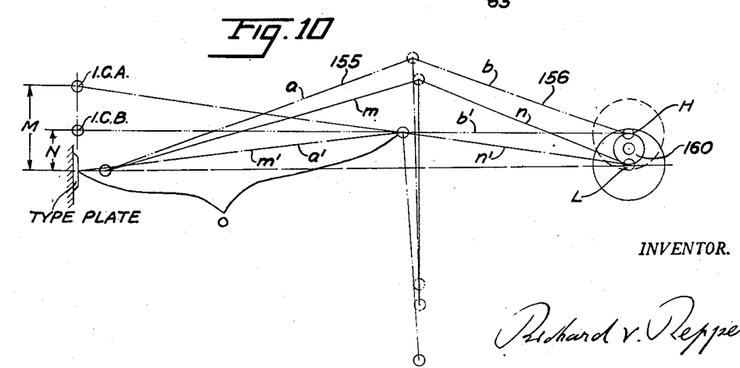
Fig. 10 is a diagrammatic view of the typing toggle linkage showing the force conditions for various positions of the toggle linkage.
Figure 12:
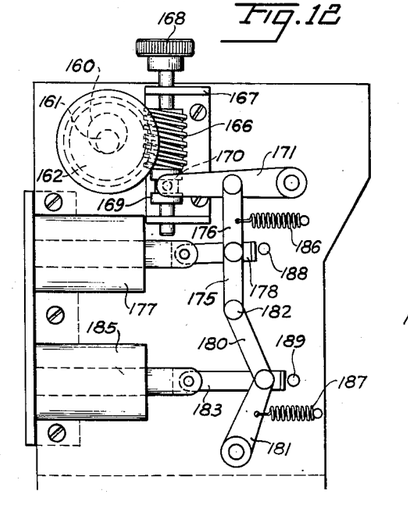
Figs. 12 and 13 are, respectively, a side elevation and a plan view of the manually operated mechanism for adjusting the typing force and the automatic adjustment thereof under control of the keys.
Figure 13:
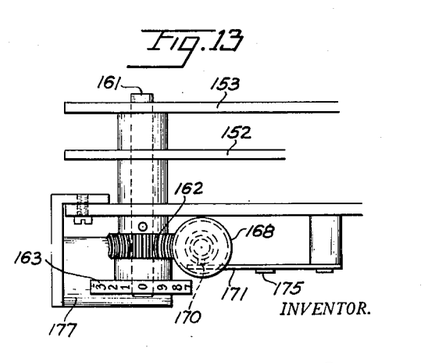

The link 156 is mounted on an eccentric 160, see Figs. 10 and 12, having bearings in the frame plates 152 and 153 an extension 161 of the eccentric, extends through plate 152 and carries a worm wheel 162 and a dial 163 with visible numbers, as a means of determining the position of the eccentric. A spring 164 on link 156, see Fig. 1, tends to hold the toggle linkage in normal position.

A worm 166 slidably mounted in bracket 167 engages the worm wheel and the worm is manually rotatable with the knob 168, to adjust the eccentric to any desired position. The worm has a grooved extension 169 which is engaged by a pin 170 on a lever 171 pivotally mounted on the frame plate 152.

Movement of the lever in either direction is accomplished by two toggle linkages, one normally straightened or closed and the other one open, each operable by a solenoid. The upper toggle linkage consisting of links 175 and 176, Fig. 12, is operable by the solenoid 177, through link 178, to open the toggle and move the lever and worm downward, thereby rotating the worm wheel and the eccentric in one direction The lower toggle linkage, consisting of links 180 and 181, is pivotally connected to the upper toggle linkage at 182 and a link 183 connects it to the solenoid 185 which functions to close the toggle and move the lever 171 upward and rotate the eccentric in the opposite direction.

Springs 186 and 187 act to reset the toggle linkages to normal position against stop pins 188 and 189.

Fig. 10 is a schematic view, showing the effect of rotating or adjusting the eccentric.

When the eccentric is adjusted to its maximum force position, its center is at H and the links 156 and 155 assume the positions a and b. Upon operation of the solenoid 159, the links assume the positions a' and b' and the typing rod is pressing against the type. The instantaneous center is at "B" and the leverage ratio is "N" to "O."

When adjusted to its minimum force condition, the center is at "L" and the links 156 and 155 assume the positions m and n. Upon operation of the solenoid the links assume the positions m' and n', and the instantaneous center is at A.

The leverage ratio is M to O, or less than one half of the maximum.

Adjustment to intermediate positions will produce intermediate leverages and typing forces.

By the described means, the eccentric and thereby the typing force, can be manually adjusted for the average type of a type plate and can then be automatically adjusted to be greater for the larger type thereon and to be lesser, for the smaller type thereon.

The operation of a key representing a large character such as a capital W or M closes the contact 3 and the circuit connection extends to the bar 10 and from there to the solenoid 185 which rotates the eccentric counter-clockwise in Fig. 12 and thereby increases the typing force. Conversely, a key representing a small character such as a period or comma, induces operation of solenoid 177 to thereby rotate the eccentric, to lessen the typing force.

Figure 11:
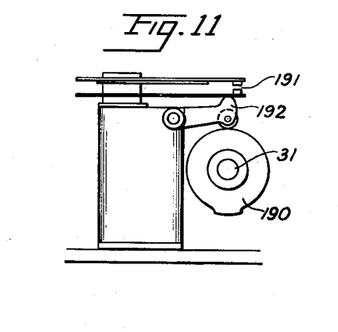
Fig. 11 is a detail view of the typing solenoid cam.

The typing mechanism is timed to function when the type plate has arrived in typing position and to accomplish this a cam 190 on the clutch shaft 31 is timed to close a contact 191 by means of a follower 192, when the type plate arrives in selected position. (See Fig. 11.)

The circuit extends from an incoming line to the contact 191, and from there to the solenoid 159 and from the solenoid to the return line.

In the diagrammatic view, Fig. 8, the circuit connections for a number of keys are shown and the keys are denoted by their letters, digits or other characters.

The operation of a key, such as, the "Q" key closes the contacts 3 and 4 and the brush 14 rests on a commutator ring-segment 18, Fig. 1, and closes a circuit with brush 19. The circuit extends from brush 19 to the magnet 24 which selects the stop position for the type plate, to stop it with the type "q" and "Q" in typing position. To type the capital "Q" the shift key 100 is operated and rotates the commutator to connect the brush 14 with the brush 20. In Fig. 8, this is indicated by shifting the brush 14 to the right to contact the brush 20.

As capital "Q" is in the same stop position on the type plate, as the lower case "q," the circuit extends to the same magnet 24, but the operation of the shift key has raised the type plate to the second row position in which the capital type are located.

The digit key "8" closes contacts 3 and 4 and from contact 3 the circuit extends to magnet 121, which functions to shift the type plate to lowest row where the digit type are located. See Fig. 7. From contact 4 the circuit extends to brush 19 and from brush 19 to the selector magnet 24 which stops the type plate in "I" position as the digit "8" is located in this position. See Fig. 7. When the shift key is operated to type the character " ' " the brush 14 will cover, two adjacent commutator ring-segments 18 and the circuit will extend to two adjacent brushes 20 and 20'.

From brush 20 the circuit extends to the magnet 24, which stops the type plate in "J" position as the type " ' " is located in this position. As the character " ' " has a very small type face, the circuit extends from the brush 20' to the magnet 177 which sets the eccentric 160, to decrease the typing force.

The circuits for the other keys are established in a similar manner, as can be seen from the diagrammatic view, Fig. 8.

Since other modifications of the invention are possible, the scope of the invention is not to be limited to the illustrated embodiment but is defined by the appended claims.

Having now particularly described my invention, what I desire to secure by Letters Patent of the United States and what I claim is:

1. A typing device adapted to be power operated, comprising a typing station, a plurality of typing keys adapted to be actuated for selecting the type to be positioned in said typing station, a typing rod adapted to be moved with variable pressure against the type positioned in said typing station, a toggle linkage including a link operatively connected to said typing rod and adapted to vary the typing pressure of said typing rod, adjusting means operatively connected to said toggle linkage and including a rotatable eccentric stud for changing the position of the fulcrum of said toggle linkage, a worm wheel on said eccentric stud, a manually operable worm gear for rotating said worm wheel and mounted for movement in either direction from a normal position for rotating said stud, means controlled by the actuation of some of said typing keys for moving said worm in one or the other direction from said normal position, and means controlled by any one of said typing keys to induce operation of the typing device.

2. In a typewriting machine having a typing station, the combination comprising a type plate having a plurality of type thereon disposed on said type plate in three parallel rows and having one row normally in alignment with said typing station and adapted to have movement of translation to position a selected type in said typing station, said movement of translation including movement to move said type plate for positioning the second and third row of type in alignment with said typing station, a plurality of typing keys adapted to be actuated for selecting the type to be positioned in said typing station, a toggle linkage operatively connected to said type plate, a second toggle linkage operatively connected to said first-mentioned toggle linkage, a manually operable key operatively connected to one of said toggle linkages for moving said type plate to position the second row of type in alignment with said typing station, and power means controlled by the actuation of certain of said typing keys to actuate both of said toggle linkages for moving the type plate to position the third row of type in alignment with said typing station.

3. In a typewriting machine having a typing station, the combination comprising a type plate having a plurality of type thereon and adapted to have variable movement of translation in either direction from a normal position for selectively positioning one of said type in said typing station; an actuating mechanism for moving the type plate in one direction; a second actuating mechanism for moving the type plate in the opposite direction; a power mechanism for each actuating mechanism having means to impart movement of uniform extent to the actuating mechanisms; movement varying means for each of the actuating mechanisms, settable to vary the movement transmitted by the actuating mechanisms to the type plate; typing keys operable for selecting the type to be positioned in said typing station; means under control of certain of said typing keys for setting the movement varying means for one of said actuating mechanisms; means under control of certain of said typing keys for setting the movement varying means for the other of said actuating mechanisms and means under control of said typing keys to initiate operation of the respective actuating mechanisms by its respective power mechanism.

4. A typing device comprising a typing station; a typing plate having a plurality of type thereon and movable for positioning one of said type in said typing station; a plurality of typing keys adapted to be operated for selecting the type to be positioned in said typing station; a typing rod adapted to be moved and pressed against the type positioned in said typing station upon operation of one of said typing keys; adjusting means settable for varying the pressure with which the typing rod presses against said type; manually operable means for setting the said adjusting means; means controlled by the operation of certain of said typing keys for setting said adjusting means and power means controlled by the operation of all of said typing keys for moving said typing rod against said type.

5. A typing device adapted to be power operated, comprising a typing station, a typing plate having a plurality of type thereon and movable for positioning one of said type in said typing station; a plurality of typing keys adapted to be manually operated for selecting the type to be positioned in said typing station; a typing rod adapted to be moved with pressure against the type in said typing station; a toggle linkage having a settable reacting fulcrum operatively connected to said typing rod; manually operable means for setting said reacting fulcrum to different positions for varying the pressure exerted by the typing rod against the type, means controlled by the operation of certain of said typing keys to set the reacting fulcrum to different positions for varying the pressure exerted by the typing rod against the type, and means controlled by the operation of all of said typing keys for operating said typing device.

6. In a typewriting machine having a typing station, the combination comprising a type plate having a plurality of type disposed thereon in three horizontal and a plurality of vertical rows and adapted to position a selected type in said typing station and to have movement of translation in a horizontal path for selecting a vertical row of type and movement of translation in a vertical direction for moving the type plate from the normal or first row position to a second or third row position for selecting a type in the vertical row; typing keys adapted to be operated for selecting a type to be positioned in said typing station; a linkage operable for moving the type plate vertically from the first row position to the second or third row position; a manually operable key for operating the linkage for moving the type plate vertically from the first row position to the second row position; power means controlled by the operation of certain of said typing keys for operating said linkage for moving the type plate vertically from the first row position to the third row position and power means controlled by the operation of all of said typing keys for moving said type plate in said horizontal path.

RICHARD V. REPPERT.

REFERENCES CITED

The following references are of record in the file of this patent:

UNITED STATES PATENTS

| Number | Name | Date |
|---|---|---|
| 436,319 | Silkman | Sept. 9, 1890 |
| 996,300 | Timmis | June 27, 1911 |
| 1,961,644 | Sampson | June 5, 1934 |
| 2,007,228 | Trego | July 9, 1935 |
| 2,105,731 | Grayes et al. | Jan. 18, 1938 |
| 2,127,508 | Fuchs | Aug. 23, 1938 |
| 2,127,530 | Reppert | Aug. 23, 1938 |